US010640880B2

(12) United States Patent
Takahashi

(10) Patent No.: US 10,640,880 B2
(45) Date of Patent: May 5, 2020

(54) PLATED MATERIAL AND CONNECTING TERMINAL USING SAME

(71) Applicant: Oriental Electro Plating Corporation, Kobe-shi, Hyogo (JP)

(72) Inventor: Hiroyoshi Takahashi, Kobe (JP)

(73) Assignee: Oriental Electro Plating Corporation, Kobe-shi, Hyogo (JP)

( * ) Notice: Subject to any disclaimer, the term of this patent is extended or adjusted under 35 U.S.C. 154(b) by 186 days.

(21) Appl. No.: 15/837,769

(22) Filed: Dec. 11, 2017

(65) Prior Publication Data

US 2018/0112322 A1 Apr. 26, 2018

Related U.S. Application Data

(62) Division of application No. 15/028,051, filed as application No. PCT/JP2014/002169 on Apr. 16, 2014.

(30) Foreign Application Priority Data

Jun. 24, 2013 (JP) ................................ 2013-131317
Nov. 18, 2013 (JP) ................................ 2013-238010
Mar. 14, 2014 (JP) ................................ 2014-051824

(51) Int. Cl.
*B32B 15/01* (2006.01)
*C25D 5/12* (2006.01)
(Continued)

(52) U.S. Cl.
CPC ................ *C25D 5/12* (2013.01); *C25D 3/12* (2013.01); *C25D 3/40* (2013.01); *C25D 3/46* (2013.01);
(Continued)

(58) Field of Classification Search
None
See application file for complete search history.

(56) References Cited

U.S. PATENT DOCUMENTS 5,780,172 A * 7/1998 Fister ...................... B32B 15/01 428/647
2003/0186597 A1 10/2003 Suzuki et al.
(Continued)

FOREIGN PATENT DOCUMENTS

JP S 60-0228695 A 11/1985
JP S61-266597 A 11/1986
(Continued)

OTHER PUBLICATIONS

Office Action dated Aug. 13, 2018 in U.S. Appl. No. 15/028,051, by Takahashi.

(Continued)

*Primary Examiner* — Seth Dumbris
(74) *Attorney, Agent, or Firm* — Panitch Schwarze Belisario & Nadel LLP

(57) ABSTRACT

Provided are a plated material having excellent abrasion resistance, electrical conductivity, sliding performance, and low friction, in which a plating layer does not undergo embrittlement properly; and a method for producing the plated material. The method includes a first step of at least partially removing a reflow tin plating layer from a metallic base material having the reflow layer on at least a part thereof and a reactive layer provided at the interface between the reflow layer and the base material; a second step of at least partially subjecting a region in which the reflow tin plating layer has been removed to a nickel plating treatment; a third step of at least partially subjecting the nickel plating layer to a silver strike plating treatment; and
(Continued)

a fourth step of at least partially subjecting a region of the silver strike plating to a silver plating treatment.

3 Claims, 3 Drawing Sheets

(51) Int. Cl.

| | |
|---|---|
| ***H01R 13/03*** | (2006.01) |
| ***C25D 3/12*** | (2006.01) |
| ***C25D 3/40*** | (2006.01) |
| ***C25D 3/46*** | (2006.01) |
| ***C25D 3/48*** | (2006.01) |
| ***C25D 3/50*** | (2006.01) |
| ***C25D 5/48*** | (2006.01) |
| ***C25D 5/50*** | (2006.01) |
| ***C25F 1/00*** | (2006.01) |
| ***C25F 5/00*** | (2006.01) |
| *C25D 3/30* | (2006.01) |

(52) U.S. Cl.

CPC ................ *C25D 3/48* (2013.01); *C25D 3/50* (2013.01); *C25D 5/48* (2013.01); *C25D 5/505* (2013.01); *C25F 1/00* (2013.01); *C25F 5/00* (2013.01); *H01R 13/03* (2013.01); *C25D 3/30* (2013.01); *Y10T 428/12896* (2015.01)

(56) References Cited

U.S. PATENT DOCUMENTS

| | | | |
|---|---|---|---|
| 2009/0017327 | A1 | 1/2009 | Chen et al. |
| 2012/0067733 | A1 | 3/2012 | Zhang-Beglinger et al. |

FOREIGN PATENT DOCUMENTS

| | | | |
|---|---|---|---|
| JP | H 08-176883 | A | 7/1996 |
| JP | 2001003194 | A | 1/2001 |
| JP | 200957630 | A | 3/2009 |
| JP | 2010-198780 | A | 9/2010 |
| JP | 2010232681 | A | 10/2010 |
| JP | 2011202266 | A | 10/2011 |

OTHER PUBLICATIONS

Office Action dated Jan. 24, 2018 in U.S. Appl. No. 15/028, 051, by Takahashi.

Int'l Search Report dated Jul. 22, 2014 in Int'l Application No. PCT/JP2014/002169.

* cited by examiner

PLATED MATERIAL AND CONNECTING TERMINAL USING SAME

CROSS-REFERENCE TO RELATED APPLICATION

This application is a Divisional of U.S. Patent Application No. 15/028,051, filed Apr. 8, 2016, which is a Section 371 of International Application No. PCT/JP2014/002169, filed Apr. 16, 2014, which was published in the Japanese language on Dec. 31, 2014 under International Publication No. WO 2014/207975A1, and claims priority to Japanese Patent Application No. 2013-131317 , filed Jun. 24, 2013, Japanese Patent Application No. 2013-238010, filed Nov. 18, 2013, and Japanese Patent Application No. 2014-051824, filed Mar. 14, 2014, the disclosures of which are incorporated herein by reference.

TECHNICAL FIELD

The present invention relates to a method for manufacturing a plated material and a plated material to be obtained with the manufacturing method, and more specifically relates to a plated material that has superior abrasion resistance, electrical conductivity, slidability and low frictional property, and, that is suitable for suppressing embrittlement of plated layers, and a manufacturing method thereof

BACKGROUND TECHNOLOGY

Silver plating has superior characteristics in low contact resistivity, heat resistance and the like, and is widely utilized for electric/electronic components, such as various contacts, terminals, connectors or switches, (for example, see Patent Literature 1 (Japanese Patent Application Laid-Open No. 2001-3194)).

Recently, electric cars, plug-in hybrid cars and the like have become popular, and in association with this, battery chargers, such as battery chargers for household use or rapid battery chargers, also become popular. A terminal of a charging connector to connect a car and a battery charger has to endure connection and disconnection actions over several tens of thousands of times in addition to a use under high voltage and high electrical current.

Herein, tin-plated or reflow tin-plated materials on a copper substrate are often used for the terminals of electric and electronic components above, and if a surface of the material can be excellently silver-plated, it is believed that superior abrasion resistance and electrical conductivity can be added to a terminal.

However, it is extremely difficult to plate silver, which is noble metal, on tin, which is base metal, and displacement between tin and silver occurs due to a potential difference between tin and silver (diffused from each other), and peeling of silver plating or the like happens to occur. From those reasons, it is a current situation where a technology to laminate excellent silver plating on tin plating does not exist.

In this regard, for example, in Patent Literature 2 (Japanese Patent Application Laid-Open H8-176883), a manufacturing method for plated materials including steps to establish a Sn-plated layer at least on a portion of a base material surface made from copper or copper alloy, and to composite-plate one or more types out of Cu, In, Ag, Zn and Sb on the Sn-plated layer is disclosed.

However, the manufacturing method described in Patent Literature 2 aims at manufacturing of the Sn alloy-plated material, and it is characterized by forming a Sn alloy-plated layer containing 80% to 99% of Sn (provided a total amount of Cu, Zn and Sb in the plated layer is 10% or less) on at least a portion of the base material surface, by heating a composite plating obtained in the step above. The technique is to alloy tin and silver by heating, and poor adhesion between tin plating and silver plating is not a serious problem (in other words, this is not a technology to laminate excellent silver plating on tin plating).

In the meantime, when a base material (metal material) is directly silver-plated and the metal substrate makes direct contact with the silver-plated layer, the silver-plated layer happens to be embrittled in association with diffusion and reaction of atoms in the metal substrate with silver.

PRIOR ART LITERATURE

Patent Literature

Japanese Patent Application Laid-Open 2001-3194
Japanese Patent Application Laid-Open H8-176883

SUMMARY OF THE INVENTION

Problem to be Solved by the Invention

In reflection of such problems in the prior art, the objective of the present invention is to provide a plated material that has superior abrasion resistance, electrical conductivity, slidability and low frictional property, and, that is suitable for suppressing embrittlement of the silver-plated layer, and a manufacturing method thereof.

Means for Solving the Problem

The present inventor, as a result of keen study about a method for manufacturing a plated material in order to accomplish the objective above, has discovered that it would be extremely effective to form a nickel-plated layer in a region where a reflow tin-plated layer has been peeled, and to apply silver strike-plating and silver-plating to the nickel-plated layer, in order to obtain a preferred plated material that has superior abrasion resistance, electrical conductivity, sliding performance and low friction, and, that is suitable for suppression of embrittlement of a silver-plated layer, and has accomplished the present invention.

In other words, the present invention provides a method for manufacturing a plated material, including:

- a first step to peel at least a portion of a reflow tin-plated layer from a metal substrate that comprises the reflow tin-plated layer at least partially, and that comprises a reactive layer on an interface between the reflow tin-plated layer and the metal substrate;
- a second step to apply nickel plate processing to at least a portion in a region where the reflow tin-plated layer has been peeled;
- a third step to apply silver strike plate processing to at least a portion of the nickel-plated layer formed by the nickel plate processing; and
- a fourth step to apply silver plate processing to at least a portion of the region where silver strike plate processing has been applied.

In the method for manufacturing a plated material, as preceding processing of the second step, it is preferable that one or more types of strike plating to be selected from a group constituting of silver strike plating, gold strike plating, palladium strike plating, nickel strike plating and copper strike plating is applied to any region of the region where the reflow tin-plated layer has been peeled, and where the nickel-plated layer is going to be formed. The application of the strike plate processing to the region where a nickel-plated layer is formed in the region where the reflow tin-plated layer has been peeled enables further certain improvement of the adhesion between the peeled region and the nickel-plated layer.

In the method for manufacturing a plated material relating to the present invention, prior to the first step, a preceding step to apply reflow process to the tin-plated layer out of the metal substrate including a tin-plated layer at least in a portion, and to convert the tin-plated layer into a reflow tin-plated layer, and, to form a reactive layer on an interface between the reflow tin-plated layer and the metal substrate may be included.

Here, the reflow process in the preceding step is process to heat the electrodeposited tin-plated layer and to melt it, and then to rapidly cool the layer. The melting of the tin-plated layer enables removal of stress (distortion) upon plating, and the formation of a reactive layer on the interface between the metal substrate and the tin-plated layer enables reduction of a change of the tin-plated layer over time.

Further, a reactive layer is formed On an interface between the tin-plated layer and the metal substrate by reflow process. As long as [the reactive layer] has an effect of suppression of atomic diffusion and/or reaction between the metal substrate and each plated layer, composition and shape of the reactive layer are not particularly limited, but it is preferable that the reactive layer contains $Cu_3Sn$.

As conditions for the reflow process, conventionally-known various reflow processes can be used within a scope not impairing the effect of the present invention. In the reflow process, a tin-plated layer that has been applied on a part of or over an entire surface of the metal substrate should be melted by heating to a melting point of tin or higher. A temperature for mitigating internal stress of the tin-plated layer is preferably 250° C. to 600° C., and is more preferably 300° C. to 500° C., and is further preferably 350° C. to 450° C. Further, a processing time for improving the plated appearance is preferable 3 sec to 40 sec, is more preferably 5 sec to 30 sec and is further preferably 5 sec to 20 sec. Other the above, it is preferable to conduct heat treatment under a reductive atmosphere or an inert atmosphere.

Further, in the method for manufacturing a plated material relating to the present invention, at least a portion of the reflow tin-plated layer is peeled from the metal substrate in the first step. As a method for peeling the reflow tin-plated layer, conventionally-known various detachment methods can be used within a scope not impairing the effect of the present invention, and for example, a method for immersion peeling, electrolytic peeling or the like of a portion that is desired to be peeled in the reflow tin-plated layer using an appropriate peeling solution can be used.

For the peeling solution that is used in the first step, sulfuric acid, nitric acid and a solution where sodium hydroxide is dissolved, with addition of an oxidant, can be exemplified, and in order to leave $Cu_3Sn$ in the reactive layer and to peel only tin off the surface, it is preferable to use an acidic peeling solution. Further, if a sulfuric acid solution is used, since there is a possibility where sulfur (S) remains in sulfuric acid after peeling and reaction with the silver plating may cause discoloration, transformation or the like, it is more preferable to use a nitric acid solution. Furthermore, since the reactive layer is formed on an interface between the reflow tin-plated layer and the metal substrate, an outermost layer of the metal substrate in the region where the reflow tin-plated layer has been peeled is the reactive layer.

In the method for manufacturing a plated material relating to the present invention, at least a portion of the peeled area obtained in the first step is nickel-plated in the second step. Herein, it is preferable that the nickel-plated layer that is formed with the nickel-plate processing in the second step has continuous film shape and thickness of the nickel-plated layer is 0.05 μm to 10 μm. Further, more preferable thickness of the nickel-plated layer is 0.5 μm to 2 μm. If this is less than 0.5 μm, it lacks a barrier effect, and if this is 10 μm or thicker, it becomes easier to cause a crack at the time of bending processing. Furthermore, the nickel-plated layer may have discontinuous film shape, such as granular or insular, within a scope not impairing the effect of the present invention. In the case of the latter, the granular or insular portion may be partially continued.

In the method for manufacturing a plated material relating to the present invention, at least a portion of the nickel-plated layer obtained in the second step is silver-strike-plated in the third step. Here, the silver strike-plated layer that is formed with the silver strike plate processing in the third step may have continuous film shape or discontinuous film shape, such as granular or insular, within a scope not impairing the effect of the present invention. In the case of the latter, the granular or insular portion may be partially continued. It is preferable that the thickness of the silver strike-plated layer is 0.01 μm to 0.5 μm. Furthermore, a silver-plated layer is formed on the silver strike-plated layer with the silver plate processing in the fourth step, and a schematically-single silver-plated layer is obtained.

Further, in the method for manufacturing a plated material relating to the present invention, it is preferable that the thickness of the single silver-plated layer obtained via the silver plate processing in the fourth step is 1 μm to 50 μm. Furthermore, the thickness is a value where the silver strike-plated layer and the silver-plated layer are joined.

The single silver-plated layer obtained via the silver plate processing in the fourth step has basically uniform thickness, but it can be partially thinner or thicker within a scope not impairing the effect of the present invention. Further, it is preferable that Vickers hardness of the silver-plated layer is 10 HV to 250 HV.

Further, the present invention provides a plated material to be obtained with the method for manufacturing a plated material described above, as well, and the plated material is a plated material, having a region where a reflow tin-plated layer has been formed and another region where a silver-plated layer has been formed, on a surface of a metal substrate, respectively, and it is characterized such that the silver-plated layer is formed on the surface of the metal substrate via a nickel-plated layer; the reflow tin-plated layer and the nickel-plated layer are formed on the surface of the metal substrate via a reactive layer, respectively; the silver-plated layer is metallurgically bonded to the nickel-plated layer; and the nickel-plated layer is metallurgically bonded to the reactive layer.

The metallurgical bonding means that each layer is not bonded via structural joining, such as an anchor effect, or a heterogeneous bonding layer, such as an adhesive, but metals are directly bonded with each other. The metallurgical bonding is a concept naturally including bonding by crystallographical matching (epitaxy), and it is preferable in the present invention that bonding by the crystallographical matching (epitaxy) has been accomplished in the reflow tin-plated layer and the silver-plated layer with each other.

In the plated material of the present invention, it is preferable that the reactive layer has $Cu_3Sn$. Because the reactive layer is present, embrittlement of the silver-plated layer in association with diffusion and reaction between atoms of the metal substrate (for example, copper) and silver can be suppressed.

Further, the present invention relates to a connecting terminal including the plated material of the present invention, as well, and in the connecting terminal, a male terminal and/or a female terminal is made from the plated material of the present invention above.

In the connecting terminal of the present invention, it is preferable that the outermost surface of a joint requiring abrasion resistance is a reflow tin-plated layer and the outermost surface of a contact part requiring an electrical conductivity is a silver-plated layer.

Effect of the Invention

According to the method for manufacturing a plated material relating to the present invention, a plated material that has superior abrasion resistance, electrical conductivity, sliding performance and low friction, and, that is suitable for suppression of embrittlement of the plated layers, and the manufacturing method thereof can be provided. Further, the plated material of the present invention can be preferably used as a material for a connecting terminal requiring a superior abrasion resistance characteristic and electrical conductivity, and a connecting terminal combining superior abrasion resistance and electrical conductivity, and a fitting property can be provided.

MODE FOR CARRYING OUT THE INVENTION

Hereafter, typical embodiments of the method for manufacturing a plated material, the plated material and the connecting terminal of the present invention are explained in detail with reference to drawings, but the present invention shall not be limited to only these. Furthermore, in the explanation below, the same symbols are marked in the same or equivalent portions/parts, and redundant explanations may be omitted. Further, since the drawings are for conceptually explaining the present invention, dimensions of each constituent element and ratios thereof mentioned below may be different from actual ones.

«Method for Manufacturing Plated Material»

Figure 1:
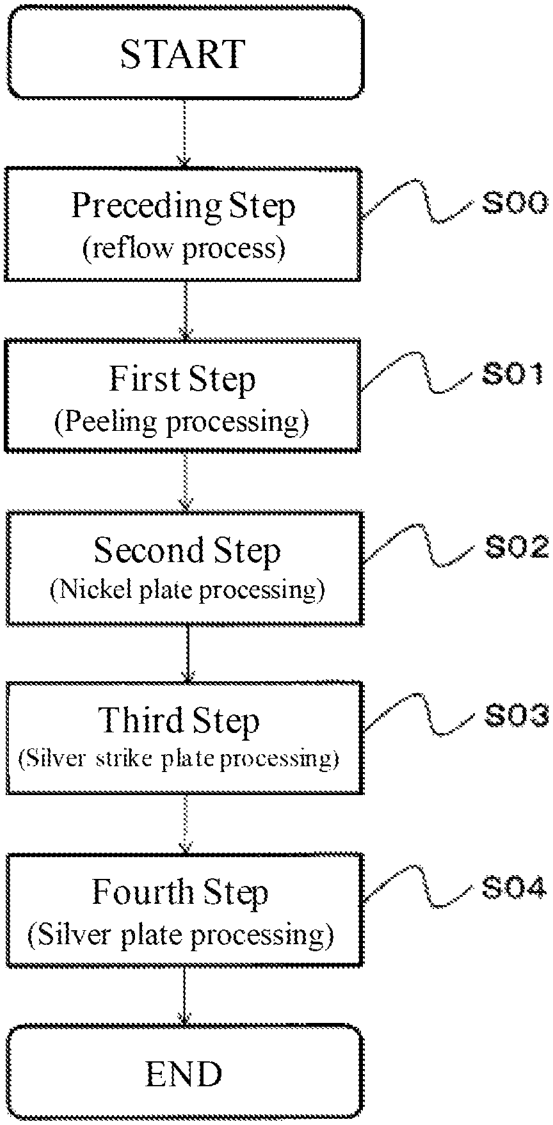
FIG. 1 is a process chart of the method for manufacturing a plated material relating to the present invention.

FIG. 1 is a process chart of the method for manufacturing a plated material relating to the present invention. The method for manufacturing a plated material relating to the present invention is a method for manufacturing a plated material having a metal substrate, a reflow tin-plated layer, a nickel-plated layer and a silver-plated layer, and includes the first step (S01) to peel at least a portion of the reflow tin-plated layer from the metal substrate; the second step (S0) to form a nickel-plated layer in at least a portion of the region where the reflow tin-plated layer has been peeled; the third step (S0) to apply silver strike-plate processing to at least a portion of the nickel plated layer; and the fourth step (S0) to apply silver plate processing to at least a portion of the region where the silver strike plate processing has been applied.

In the method for manufacturing a plated material relating to the present invention, a preceding step (S00) to apply reflow process to the tin-plated layer out of the metal substrate including the tin-plated layer at least in a portion, and to convert the tin-plated layer into a reflow tin-plated layer, and, to form a reactive layer on an interface between the reflow tin-plated layer and the metal substrate, may be included before the first step (S01).

Metal used for the metal substrate is not particularly limited as long as having the electrical conductivity, and for example, aluminum and aluminum alloy, iron and iron alloy, titanium and titanium alloy, stainless, copper and copper alloy and the like can be exemplified, and among them, it is preferable to use copper and copper alloy.

The reflow process is applied to the plated material having the tin-plated layer on the surface of the metal surface in the preceding step (S00) and washing treatment is conducted after the reflow process, and a plated material can be obtained via the first step (S01) the second step (S02), the third step (S03) and the fourth step (S04). Hereafter, each treatment/processing is explained in detail.

(Tin Plate Processing)

For materials where a metal substrate is tin-plated, and materials where the reflow process has been applied to the metal substrate having a tin-plated layer, commercially-available materials can be used. Further, for tin-plating, conventionally-known various tin-plating techniques can be used without impairing effects of the present invention.

As a tin-plating bath, there are an acidic bath, a neutral bath and an alkali bath, and any of these is usable. A sulfuric acid bath and an organic sulfonic acid bath as the acidic bath, a pyrophosphoric acid bath and a gluconic acid bath as the neutral bath, and a potassium stannate bath and a sodium stannate bath as the alkali bath are common.

(2) Reflow Process (Preceding Step (S00)

In general, a reflow to the tin plating, is processing for suppressing a growth of whisker (needle-state metallic crystal) in association with a passage of a time, and a method for heating an electrodeposited tin-plated layer to melt the tin-plated layer, and for quickly cooling the tin-plated layer is used. Stress (distortion) upon plating is removed by melting the tin-plated layer, and a change over time can be reduced by forming a reactive layer with the metal substrate. Furthermore, in the method for manufacturing a plated material relating to the present invention, formation of the reactive layer on the interface between the tin-plated layer and the metal substrate is a primary purpose of the reflow process. Although it is said that the whisker above is caused by generation of $Cu_6Sn_5$ where size of crystal lattices generated on the interface between copper and tin plating is great due to diffusion of copper and tin plating; the reflow process is conducted for suppression of this whisker generation, and delicate $Cu_3Sn$ is formed to allow it to be a barrier layer, and diffusion of copper is suppressed and the whisker generation is suppressed.

For the reflow process, the tin-plated layer that is applied to a portion of or entire surface of the metal substrate should be heated and melted at a melting point or higher of tin. In order to mitigate internal stress of the tin-plated layer, preferable treatment temperature is 250° C. to 600° C. more preferably 300° C. to 500 and further preferably 350° C. to 450° C. Further, in order to improve plated appearance, the preferable processing time is for 30 seconds to 40 seconds, more preferably for 5 seconds to 30 seconds and further preferably for 5 seconds to 20 seconds. Other than those, the heating treatment is performed preferably under a reductive atmosphere or an inert atmosphere. Furthermore, the preceding step (S00) can be omitted by purchasing a plated material where the reflow process has been applied to a metal substrate having a tin-plated layer.

(3) Washing Treatment

The washing step is an optional step, and it is not shown in FIG. 1 but is a step to wash at least the surface of the reflow tin-plated layer out of the metal substrate having the reflow tin-plated layer. Herein, conventionally-known various washing treatment liquids and treatment conditions can be used within a scope not impairing the effects of the present invention.

For the washing treatment liquids, common immersional degreasing solutions or electrolytic degreasing solutions for non-ferrous metal(s) can be used, and in order to prevent corrosion of tin, which is an amphoteric metal, it is preferable to use the washing treatment solutions at pH exceeding 2 and less than 11, and it is preferable to avoid a use of a strong acidic bath at pH 2 or lower and a strong alkali bath at pH 11 or higher.

Specifically, [the tin-plated layer] is immersed into a bath where 0.1 to 10 g/L of surfactant is added to a slightly alkaline bath where 10 g to 50 g/L of sodium tertiary phosphate, sodium carbonate, sodium metasilicate, sodium orthosilicate or the like has been dissolved, at 20° C. to 70° C. of bath temperature for 10 seconds to 60 seconds. Further, cathode electrolytic degreasing can be performed at 2 to 5 $A/dm^2$ of cathode current density using an insoluble anode, such as stainless steel, a titanium platinum plate or iridium oxide, for the anode.

(4) Peeling Processing (First Step (S01))

The peeling processing is processing for peeling the reflow tin-plated layer from any region of the plated material to allow the outermost surface of the plated material to be a reactive layer. For regions where the peeling processing is unnecessary, masking is applied using conventionally-known various methods, such as a tape, a sparger mask, a resist or an inkjet print method, the peeling processing can be applied to only a region where a silver-plated layer is desired to be formed at last.

For a method for peeling the reflow tin-plated layer, conventionally-known various peeling methods can be used within a scope not impairing the effect of the present invention, and for example, a method for immersion peeling, electrolytic peeling or the like of a portion, which is desired to be peeled, in the reflow tin-plated layer with an appropriate peeling solution can be used.

For the peeling solution that is used in the first step, sulfuric acid, nitric acid and a solution where sodium hydroxide is dissolved, with addition of an oxidant, can be exemplified, and in order to leave $Cu_3Sn$ in the reactive layer and to peel only tin on the surface, it is preferable to use an acidic peeling solution. Further., if a sulfuric acid solution is used., since there is a possibility where sulfur (S) remains in sulfuric acid after peeling and reaction with the silver plating may cause discoloration, transformation or the like, it is more preferable to use a nitric acid solution. Furthermore, since the reactive layer is formed on an interface between the reflow tin-plated layer and the metal substrate, an outermost layer of the metal substrate in the region where the reflow tin-plated layer has been peeled is the reactive layer.

(5) Strike Plate Processing

A strike plate processing as a preliminary processing of nickel plate processing (second step (S02)) is an optional step, and it is not shown in FIG. 1, but adhesion of nickel plating can be certainly improved by applying one or more strike-plates to be selected from a group constituting of silver strike plating; gold strike plating, palladium strike plating; nickel strike plating and copper strike plating.

(A) Silver Strike Plating

As the silver strike plating bath, for example, a bath containing silver salt, such as silver cyanide or silver potassium cyanide, and conductive salt; such as potassium cyanide or potassium pyrophosphate, can be used.

For the silver strike plate processing, conventionally-known various silver plating techniques can be used within a scope not impairing the effects of the present invention, and it is preferable to lower the concentration of silver salt in the plating bath and to increase the concentration of the conductive salt compared to normal silver plating.

The silver strike plating bath that can be suitably used for the silver strike plate processing is composed of silver salt, alkali cyanide salt and conductive salt, and a brightening agent may be added as needed. Suitable usages of each constitutional element are 1 to 10 g/L for the silver salt, 80 to 200 g/L for the alkali cyanide salt, 0 to 100 g/L for the conductive salt and up to 1,000 ppm for the brightening agent.

As the silver salt, for example, silver cyanide, silver iodide, silver oxide, silver sulfate, silver nitrate, silver chloride and the like are exemplified, and as the conductive salt, for example, potassium cyanide, sodium cyanide, potassium pyrophosphate, potassium iodide, sodium thiosulfate and the like are exemplified.

As the brightening agent, a metallic brightening agent and/or an organic brightening agent can be used. Further, as the metallic brightening agent, antimony (Sb), selenium (Se), tellurium (Te) and the like can be exemplified, and as the organic brightening agent, aromatic sulfonic acid compounds, such as benzenesulfonic acid, mercaptans and the like can be exemplified.

Silver strike plating conditions, such as bath temperature of the silver strike plating bath, anode materials or current density, can be appropriately set according to the plating bath to be used and requiring plating thickness and the like. For example, it is preferable to use insoluble anodes, such as stainless steel, a titanium platinum plate or iridium oxide, for the anode materials. Further, as the preferred plating conditions, 15° C. to 50° C. for bath temperature, 0.5 to 5 $A/dm^2$ for current density and 5 seconds to 60 seconds for treatment time can be exemplified.

Furthermore, the silver strike plating may be applied to the entire surface of the tin-plated layer, and may be applied to only a region where nickel plating is desired to be formed in the second step (S02).

(B) Gold Strike Plating

As the gold strike plating bath, for example, one containing gold salt, conductive salt, a chelating agent and a crystal growing agent can be used. Further, for the gold strike plating bath, a brightening agent can be added.

For the gold salt, for example, gold cyanide, gold (I) potassium cyanide, gold (II) potassium cyanide, gold sodium sulfite, gold sodium thiosulfate or the like can be used. For the conductive salt, potassium citrate, potassium phosphate, potassium pyrophosphate, potassium thiosulfate or the like can be used. For the chelating agent, for example, ethylenediaminetetraacetic acid, methylenephosphonic acid or the like can be used. For the crystal growing agent, for example, cobalt, nickel, thallium, silver, palladium, tin, zinc, copper, bismuth, indium, arsenic, cadmium or the like can be used. Furthermore, as the pH adjuster, for example, polyphosphoric acid, citric acid, tartaric acid, potassium hydroxide, hydrochloric acid or the like may be added.

As the brightening agent, a metal brightening agent and/or an organic brightening agent can be used. Further, as the metal brightening agent, antimony (Sb), selenium (Se), tellurium (Te) and the like can be exemplified, and as the organic brightening agent, aromatic sulfonic acid compounds, such as benzenesulfonic acid, mercaptans and the like can be exemplified.

A preferred usage of each constitutional element in the gold strike plating bath that can be preferably used for the gold strike plating treatment is 1 to 10 g/L for the gold salt, 0 to 200 g/L for conductive salt, 0 to 30 g/L for the chelating agent, and 0 to 30 g/L for crystal growing agent.

The gold strike plating conditions, such as bath temperature of the gold strike plating bath, the anode materials or the current density, can be appropriately set according to the plating bath to be used, requiring plating thickness and the like. For example, for the anode materials, it is preferable to use insoluble anodes, such as titanium platinum plate or iridium oxide, or the like. Further, as the preferred plating conditions, 20 to 40° C. for the bath temperature, 0.1 to 5.0 A/dm$^2$ for the current density, 1 second to 60 seconds for the treatment time and 0.5 to 7.0 for pH can be exemplified.

Furthermore, the gold strike plating may be applied to the entire surface of the metal substrate, and may be applied to only a region where nickel plating is desired to be applied in the second step (S02).

(C) Palladium Strike Plating

For the palladium strike plating bath, for example, a bath containing palladium salt and conductive salt can be used. Further, for the palladium strike plating bath, a brightening agent may be added.

For the palladium salt, for example, palladium chloride, palladium nitrate, palladium sulfate, dichloro tetraamminepalladium, diamino dichloropalladium or the like can be used. For the conductive salt, for example, potassium phosphate, potassium pyrophosphate, ammonium chloride, ammonium citrate, ammonium nitrate, sodium nitrate, potassium citrate or the like can be used. For the chelating agent, for example, ethylenediaminetetraacetic acid, methylenephosphonic acid or the like can be used.

As the brightening agent, saccharine sodium, sodium benzenesulfonate, benzene sulfonamide, butynediol, sodium benzaldehyde sulfonate and the like can be exemplified.

Preferred usages of each constituent element in a palladium strike plating bath that can be preferably used for palladium strike plate processing are 0.5 to 20 g/L for the palladium salt, 50 to 200 g/L for the conductive salt and 0 to 50 g/L for the brightening agent.

Palladium strike plating conditions, such as bath temperature of a palladium strike plating bath, anode materials or current density, can be appropriately set according to the plating bath to be used, required plating thickness and the like. For example, for the anode materials, it is preferable to use insoluble anodes, such as titanium platinum plate or iridium oxide, or the like. Further, as the preferred plating conditions, 20° C. to 50° C. for the bath temperature, 0.1 to 5.0 a/dm$^2$ for the current density, and 1 second to 60 seconds for the treatment time can be exemplified.

Furthermore, the palladium strike plating may be applied to the entire surface of a metal substrate, and may be applied to only a region where nickel plating is desired to be formed in the second step (S02).

(D) Nickel Strike Plating

As a nickel strike plating bath, for example, a bath containing nickel salt, an anodic dissolution promoter and a pH buffering agent can be used. Further, for the nickel strike plating bath, an additive may be added.

For the nickel salt, for example, nickel sulfate, nickel sulfamate, nickel chloride or the like can be used. For the anodic dissolution promoter, for example, nickel chloride, hydrochloric acid or the like can be used. For the pH buffering agent, for example, boric acid, nickel acetate, citric acid or the like can be used. For the additive, for example, primary brightening agents (such as saccharin, benzene, (di- or tri-) naphthalene, sodium sulfonate, sulfonamide or sulfinic acid), secondary brightening agents (organic compounds: such as butynediol, coumarin or allyl aldehyde sulfonic, metallic salts: such as cobalt, lead or zinc), pit prevention agents (such as sodium lauryl sulfate) or the like can be used.

Preferred usages of each constituent element in the nickel strike plating bath that can be preferably used for the nickel strike plate processing are 100 to 300 g/L for nickel salt, 0 to 300 g/L for the anodic dissolution promoter, 0 to 50 g/L for the pH buffering agent, and 0 to 20 g/L for the additive.

The nickel strike plating conditions, such as bath temperature of the nickel strike plating bath, the anode materials or the current density, can be appropriately set according to the plating bath to be used, required plating thickness and the like. For example, for the anode materials, it is preferable to use soluble anodes, such as depolarized nickel or sulphur nickel, or the like. Further, as the preferred plating conditions, 20 to 30° C. for the bath temperature, 1.0 to 5.0 A/dm$^2$ for the current density, 1 second to 30 seconds for the processing time and 0.5 to 4.5 for pH can be exemplified.

Furthermore, the nickel strike plating may be applied to the entire surface of the metal substrate, or may be applied to only a region where nickel plating is desired to be formed in the second step (S02).

(E) Copper Strike Plating

As a copper strike plating bath, for example, a copper cyanide bath can be used. The copper cyanide bath is made from copper salt, alkali cyanide salt and conductive salt, and an additive(s) may be added.

For the copper salt, for example, copper cyanide or the like can be used. For the alkali cyanide salt, for example, potassium cyanide, sodium cyanide or the like can be used. For the conductive salt, for example, potassium carbonate, sodium carbonate or the like can be used. For the additive, for example, Rochelle salt, potassium selenite, sodium selenite, potassium thiocyanate, lead acetate, lead tartrate or the like can be used.

Preferred usages of each constituent element in a cyanogen-series bath that can be preferably used for the copper strike plate processing are 10 to 80 g/L for the copper salt, 20 to 50 g/L for alkali acid cyanide, 10 to 50 g/L for the conductive salt, and 0 to 60 g/L for the additive.

The copper plating conditions, such as bath temperature of the copper strike plating bath, the anode materials or the current density, can be appropriately set according to the plating bath to be used, required plating thickness and the like. For example, for the anode materials, it is preferable to use soluble anodes, such as electrolyte copper, and/or insoluble anodes, such as stainless steel, a titanium platinum plate or iridium oxide, and the like. Further, preferred plating conditions, 25° C. to 70 C. ° for the bath temperature, 0.1 to 6.0 A/dm$^2$ for the current density and 5 seconds to 60 seconds for the processing time can be exemplified.

Furthermore, the copper strike plating may be applied to the entire surface of the metal substrate, or may be applied to only a region where nickel plating is desired to be formed in the second step (S02).

For the various strike plates, only one type may be applied, and a plurality of strike plates may be laminated.

Further, when the cohesion state of the nickel plating becomes excellent even without the strike plate processing due to the surface condition of the metal substrate, the strike plate processing can be omitted.

(6) Nickel Plate Processing (Second Step (S02))

The nickel plate processing is processing to be applied for the purpose of forming a nickel-plated layer that functions as a barrier layer to prevent diffusion and reaction between tin and silver, between the tin-plated layer and the silver-plated layer. Because a nickel-plated layer exists between the tin-plated layer and the silver-plated layer, embrittlement of the tin-plated layer and/or the silver-plated layer by forming an intermetallic compound (for example, $Ag_3Sn$) in association with the diffusion and reaction between and tin and silver can be suppressed.

As the nickel plating bath, for example, Watts bath or a sulfamate bath can be used, but it is preferable to use the sulfamate bath where the stress in electrodeposits is low. Furthermore, it is preferable to avoid a strongly-acid wood strike bath. For the nickel plate processing, conventionally-known various nickel plating techniques can be used within the scope not impairing the effects of the present invention. For example, for the nickel plating bath, a bath where small amounts of a brightening agent, a leveling agent, a pit prevention agent and the like are added to a liquid made from nickel salt, such as nickel sulfate, nickel sulfamate or nickel chloride, an anode dissolving agent, such as nickel chloride, and a pH buffering agent, such as boric acid, acetic acid or citric acid, can be used. Preferred usages of each constituent element are 100 to 600 g/L for the nickel salt, 0 to 50 g/L for the anode dissolving agent, 20 to 50 g/L for the pH buffering agent and up to 5,000 rpm for the additives.

Furthermore, as described above, the nickel plated layer that is formed by the nickel plate processing in the second step (S02) has preferably a continuous film shape, and the thickness of the nickel plated layer is preferably 0.05 μm to 10 μm. If this is less than 0.05 μm, [the nickel plated layer] lacks a barrier effect, and if it is 10 μm or greater, a crack is easily generated at the time of bending processing. Furthermore, the nickel-plated layer may have a granular or insular discontinuous film shape within the scope not impairing the effects of the present invention. In the case of the latter, the granular and insular portions may be partially continued.

(7) Silver Strike Plate Processing (Third Step (S03))

The silver strike plate processing is processing to be applied in order to improve adhesion between the reactive layer and the silver-plated layer. As the silver strike plating bath, for example, a bath containing silver salt, such as silver cyanide or silver potassium cyanide, and conductive salt, such as potassium cyanide or potassium pyrophosphate, can be used.

Conventionally-known various silver plating techniques can be used for the silver strike plate processing within the scope not impairing the effects of the present invention, and it is preferable to lower the concentration of silver salt and to increase the concentration of the conductive salt in the plating bath, compared to regular silver plating.

The silver strike plating bath that can be preferably used for the silver strike plate processing is made from silver salt, alkali cyanide salt and conductive salt, and a brightening agent may be added as needed. Preferred usages of each constituent element are 1 to 10 g/L for the silver salt, 80 to 200 g/L for the alkali cyanide salt, 0 to 100 g/L for the conductive salt and up to 1,000 ppm for the brightening agent.

As the silver salt, for example, silver cyanide, silver iodide, silver oxide, silver sulfate, silver nitrate, silver chloride and the like are exemplified, and as the conductive salt, for example, potassium cyanide, sodium cyanide, potassium pyrophosphate, potassium iodide, sodium thiosulfate and the like are exemplified.

As the brightening agent, a metal brightening agent and/or an organic brightening agent can be used. Further, as the metal brightening agent, antimony (Sb), selenium (Se), tellurium (Te) and the like can be exemplified, and as the organic brightening agent, aromatic sulfonic acid compounds, such as benzenesulfonic acid; mercaptans and the like can be exemplified.

The silver strike plating conditions, such as bath temperature of the silver strike plating bath, anode materials or current density, can be appropriately set according to the plating bath to be used, the required plating thickness and the like. For example, for the anode materials, it is preferable to use insoluble anodes, such as stainless steel, a titanium platinum plate or iridium oxide. Further, as the preferred to plating conditions, 15° C. to 50° C. for the bath temperature, 0.5 to 5 A/dm$^2$ for the current density and 5 seconds to 60 seconds for the processing time can be exemplified.

Furthermore, the silver strike plating may be applied to the entire surface of the nickel-plated layer, and may be applied to only a region where the silver plating is desired to be formed in the fourth step (S04)).

(8) Silver Plate Processing (Fourth Step (S04))

The silver plate processing is processing for forming a thicker single silver-plated layer from a schematic point of view, at least in a portion out of the silver strike-plated region in the third step (S03).

Conventionally-known various silver plating techniques can be used for the silver plate processing within the scope not impairing the effect of the present invention, and it is preferable to increase the concentration of silver salt in the plating bath and to lower the concentration of the conductive salt compared to the normal silver strike plating.

The silver plating bath that can be preferably used for the silver plate processing is made from silver salt, alkali cyanide salt and conductive salt, and a brightening agent may be added as needed. Preferable usages of each constituent element are 30 to 150 g/L for the silver salt, 15 to 160 g/L for the alkali cyanide salt, 50 to 200 g/L for the conductive salt and up to 1,000 ppm for the brightening agent.

As the silver salt, for example, silver cyanide, silver iodide, silver oxide, silver sulfate, silver nitrate, silver chloride and the like are exemplified, and as the conductive salt, for example, potassium cyanide, sodium cyanide, potassium pyrophosphate, potassium iodide, sodium thiosulfate and the like are exemplified.

As the brightening agent, a metal brightening agent and/or an organic brightening agent can be used. Further, as the metal brightening agent, antimony (Sb), selenium (Se), tellurium (Te) and the like can be exemplified, and as the organic brightening agent, aromatic sulfonic acid compounds and mercaptans can be exemplified.

Plating conditions, such as bath temperature of the plating bath, anode materials or current density, can be appropriately set according to the plating bath to be used, required plating thickness and the like. For example, it is preferable to use soluble anodes, and insoluble anodes, such as stainless steel, a titanium platinum plate or iridium oxide, for the anode materials. Further, as the preferred plating conditions, 20° C. to 60° C. for the bath temperature, 0.5 to 15 A/dm$^2$ for the current density and 0.5 seconds to 10,000 seconds for the processing time can be exemplified.

Furthermore, the silver plating may be applied to the entire surfaces of the metal substrate and the tin-plated layer, and may be applied to only the region where the silver strike plating has been formed in the third step (S03).

«Plated material»

Figure 2:
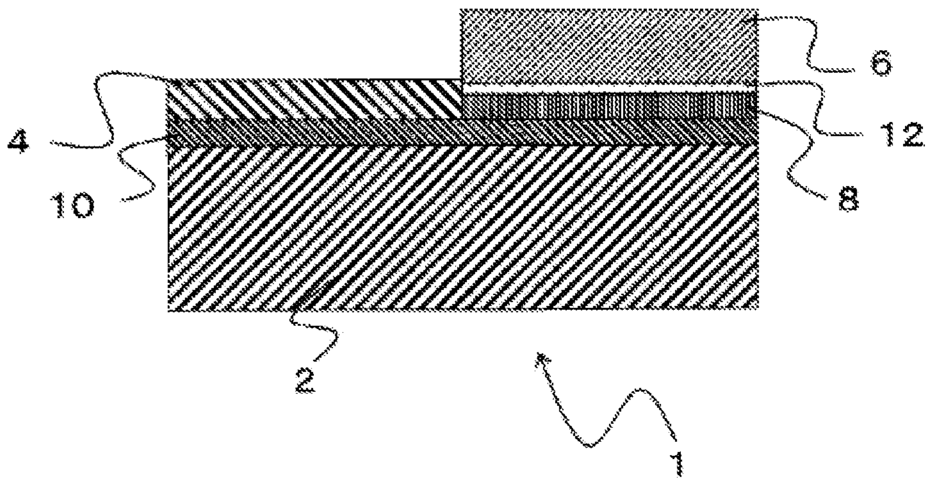
FIG. 2 is a schematic cross-sectional view showing one example of the plated material of the present invention.

FIG. 2 is a schematic cross-sectional view in one example of the embodiment of the plated material of the present invention. In a plated laminate 1, a reflow tin-plated layer 4 and a silver-plated layer 6 are formed on the surface of a metal substrate 2. The silver-plated layer 6 is formed on the surface of the metal substrate 2 via a nickel-plated layer 8, and the nickel-plated layer 8 is connected to the metal substrate 2 via a reactive layer 10. Furthermore, a silver strike-plated layer as similar to a silver strike-plated layer 12 to be described later is formed between the metal substrate 2 and the nickel-plated layer 8, as needed (not shown).

The reactive layer 10 is formed by atomic diffusion and reaction between the metal substrate 2 and the tin-plated layer in a step to apply the reflow process to the tin-plated layer to form a reflow tin-plated layer 4. The reactive layer 10 existing on an interface between the reflow tin-plated layer 4 and the metal substrate 2 and the reactive layer 10 existing on an interface between the nickel-plated layer 8 and the metal substrate 2 are basically the same reactive layers, but these may have slightly different composition and/or structure depending upon the silver plate processing and/or a aging variation.

A metal of the metal substrate 2 is not particularly limited as long as having electrical conductivity, and for example, aluminum and aluminum alloy, iron and iron alloy, titanium and titanium alloy, stainless, copper and copper alloy and the like can be exemplified, and among them, it is preferable to use copper and copper alloy because they excel in electrical conductivity, thermal conductivity and ductility.

A silver strike-plated layer 12 is formed between the nickel-plated layer 8 and the silver-plated layer 6, and the silver strike-plated layer 12 may have a continuous film shape, or granular or insular discontinuous film shape within a scope not impairing the effect of the present invention. In the case of the latter, the granular or insular portions may be partially continued. Furthermore, there is also a case where it is difficult to identify the silver strike-plated layer 12 depending upon the silver strike plating conditions. The thickness of the silver strike-plated layer 12 is preferably 0.01 μm to 0.5 μm.

The nickel-plated layer 8 preferably has a continuous film shape, and thickness of the nickel-plated layer 8 is preferably 0.05 μm to 10 μm. Further, a more preferred thickness of the nickel-plated layer 6 is 0.5 μm to 2 μm. Furthermore, the nickel-plated layer 6 may have granular or insular discontinuous film shape within the scope not impairing the effects of the present invention. In the case of the latter, the granular and insular portions can be partially continued.

The silver-plated layer 6 is formed on the surface of the silver strike-plated layer 12. The thickness of the silver-plated layer 6 is preferably 0.1 μm to 50 μm, and Vickers hardness is preferably 10 HV to 250 HV. If the thickness is less than 0.1 μm, abrasion resistance of the silver-plated layer 10 cannot be utilized, and if it is thicker than 50 μm, because a usage of silver is increased, it is not economical.

«Connecting terminal»

The plated material of the present invention can be preferably used for various connecting terminals. Specifically, an inexpensive high-performance connecting terminal can be manufactured by placing the tin-plated layer 4 on the outermost surface of a joint requiring abrasion resistance, and placing the silver-plated layer 6 on the outermost surface of a contact requiring electrical conductivity. The joint herein is a part that will be connected to other member(s) by interposing the other member(s) by inflection, swaging or the like.

Figure 3:
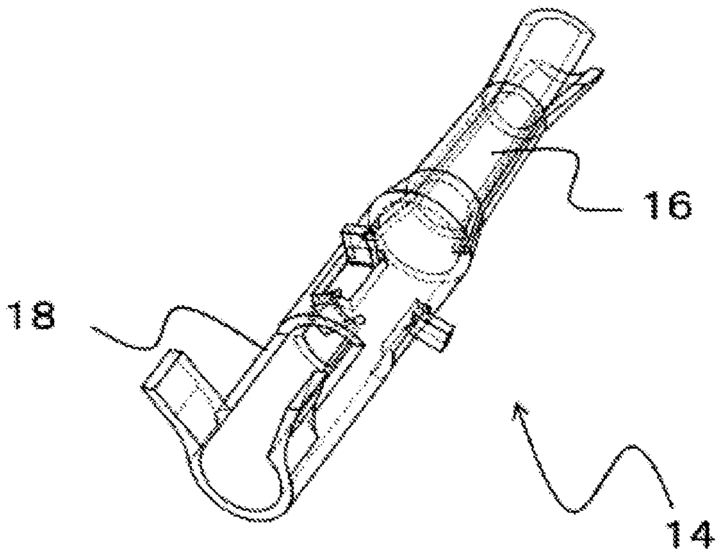
FIG. 3 is a schematic view showing one example of the connecting terminal of the present invention.

FIG. 3 is a schematic view showing one example of the connecting terminal of the present invention. A connecting terminal 14 shown in FIG. 3 is a high-voltage terminal, and the outermost surface of the contact part 16 requiring electrical conductivity in the connecting terminal 14 is the silver-plated layer 6, and the outermost surface is the tin-plated layer 4 at a connection part 18 with a harness requiring abrasion resistance.

Conventionally, reflow tin-plating excelling in bearing properties and workability has been often used for the connection terminal, and problems, such as poor abrasion resistance or high electric resistance, existed. In the meantime, superior abrasion resistance, low electric resistance and excellent heat resistance in the silver-plated layer 6 can be utilized by placing the outermost surface with the silver-plated layer 6.

In the plated material 1 of the present invention, since the nickel-plated layer 8 and the reactive layer 10 exist between the silver-plated layer 6 and the metal substrate 2 (double barrier layer), and the diffusion (or substitution) of metal (for example, copper) from the metal substrate 2 (for example, copper or copper alloy) to the silver-plated layer 6 that is attributable to the metal substrate 2 can be suppressed, and change of the silver-plated layer 6 with the passage of time can be suppressed.

In addition, a significant accident, such as ignition or electrification, caused by fragments of the tin-plated layer 4 scattered due to abrasion by sliding, can be prevented by placing the silver-plated layer 6 to the outermost surface in the region where abrasion by sliding is obvious.

Thus, the typical embodiments of the present invention were explained, but the present invention is not limited to only these, but can be variously designed, and these design changes are all included in the technical scope of the present invention.

EXAMPLE

Example 1

In a commercially-available tin-plated material (a copper alloy material with 0.6 mm of thickness was tin-plated and reflow was applied (first step)), a nickel-plated layer with 1 μm [of thickness] was formed with the steps below. A surface of the tin-plated layer was washed by immersing the tin-plated material into a washing treatment liquid at 50° C. containing 40 g/L of MAXCLEEN® NG-30 manufactured by KIZAI Corporation for 60 seconds.

Next, peeling processing (first step) was applied by immersing the washed tin-plated material into a peeling solution at 25° C. containing 300 ml/L and 100 ml/L of EVA Peels ST-40A and ST-401NC manufactured by JCU Corporation for 60 seconds, respectively. Furthermore for any regions not requiring peeling, masking is applied by attaching a masking tape (insulating tape).

Next, nickel plate processing was applied using a nickel sulfide plate as an anode material and the tin-plated material after washing treatment as a cathode material in a nickel plating bath containing 300 g/L of nickel sulfamate, 5 g/L of nickel chloride hexahydrate, 10 g/L of boric acid and 0.2 g/L of sodium lauryl sulfate, under conditions of 50° C. for the bath temperature and 2 A/dm$^2$ for the current density, for 10 seconds, and a nickel-plated layer with 0.05 μm [of thickness] was formed (second step).

Then, silver strike plate processing was applied using a titanium platinum plate as an anode material and the tin-plated material after peeling processing as a cathode material in a silver strike plating bath containing 3 g/L of silver cyanide, 150 g/L of potassium cyanide and 15 g/L of potassium carbonate, under conditions of room temperature for the bath temperature and 2 A/dm$^2$ for the current density, for 10 seconds (third step).

Next, silver strike plate processing was applied using a titanium platinum plate as an anode material and the tin-plated material after nickel plate processing as a cathode material in a silver strike plating bath containing 40 g/L of silver cyanide, 30 g/L of potassium cyanide and 30 g/L of potassium carbonate, under conditions of 30 ° C. for the bath temperature and 4 A/dm$^2$ for the current density, for 26 seconds, and a single silver-plated layer with 1 μm [of thickness] was formed (fourth step).

[Evaluation]

(1) Adhesion Evaluation

Adhesion about the plated material produced as mentioned above was evaluated. A cellophane tape (#405 manufactured by NICHIBAN Co., Ltd.) was pressed to the silver-plated layer with finger pressure, and after the cellophane tape was peeled, if peeling or swelling of the silver-plated layer did not occur, it was evaluated as ○, and if peeling or swelling occurred, it was evaluated as x, and obtained results are shown in Table 1.

(2) Confirmation of intermetallic compound ($Ag_3Sn$) phase

Whether or not an intermetallic compound ($Ag_3Sn$) phase was formed in the produced plated material was checked. Specifically, whether or not there was a diffraction peak(s) derived from the intermetallic compound ($Ag_3Sn$) phase was checked according to results of X-ray diffraction to the plated materials left at room temperature for 50 hours. A device used was Ultima IV (detector D/teXUltra, CuKα line used), and measurement was conducted under conditions of 40 kV-40 mA, 0.1° of step angle and 20° to 100 of a scan angle range. If a diffraction peak derived from the intermetallic compound (Ag $_3$Sn) phase was confirmed, it was evaluated as x, and if any diffraction peak was not confirmed, it was evaluated as ○, and the obtained results are shown in Table 1.

Example 2

Except for the formation of a nickel-plated layer with 0.1 μm of thickness by setting a time for nickel plate processing for 20 seconds, a plated material was produced as similar to Example 1 and various evaluations were conducted. Obtained results are shown in Table 1.

Example 3

Except for the formation of a silver-plated layer with 5 μm of thickness by setting a time for silver plate processing for 130 seconds, a plated material was produced as similar to Example 2 and various evaluations were conducted. Obtained results are shown in Table 1.

Example 4

Except for the formation of a silver-plated layer with 10 μm of thickness by setting a time for silver plate processing for 260 seconds, a plated material was produced as similar to Example 2 and various evaluations were conducted. Obtained results are shown in Table 1.

Example 5

A surface of the tin-plated layer was washed by immersing a commercially-available tin-plated material (a copper alloy material with 0.6 mm of thickness was tin-plated and reflow process was applied) into a washing treatment liquid at 50° C. containing 40 g/L of MAXCLEEN® NG-30 manufactured by KIZAI Corporation for 60 seconds.

Next, peeling processing was applied by immersing the washed tin-plated material into a peeling solution at 25° C. containing 300 ml/L and 100 ml/L of EVA Peels ST-40A and ST-401NC manufactured by JCU Corporation, respectively. Furthermore, for any regions not requiring peeling, masking is applied by attaching a masking tape (insulating tape).

Next, silver strike plate processing was applied using a titanium platinum material as an anode material and a tin-plated material after peeling processing as a cathode material in a silver strike plating bath containing 3 g/L of silver cyanide, 150 g/L of potassium cyanide and 15 g/L of potassium carbonate, under conditions of room temperature for the bath temperature and 2 A/dm$^2$ for the current density, for 10 seconds.

Then, nickel plate processing was applied using a nickel sulfide plate as an anode material and the tin-plated material after washing treatment as a cathode material in a nickel plating bath containing 300 g/L of nickel sulfamate, 5 g/L of nickel chloride hexahydrate, 10 g/L of boric acid and 0.2 g/L of sodium lauryl sulfate, under conditions of 50° C. for the bath temperature and 2 A/dm$^2$ for the current density, for 200 seconds, and a nickel-plated layer with 1 μm [of thickness] was formed.

Next, silver strike plate processing was applied using a titanium platinum plate as an anode material and the tin-plated material after nickel plate processing in a silver strike plating bath containing 3 g/L of silver cyanide, 150 g/L of potassium cyanide and 15 g/L of potassium carbonate, under conditions of room temperature for the bath temperature and 2 A/dm$^2$ for the current density, for 10 seconds.

Next, processing was applied using a titanium platinum plate as an anode material and the tin-plated material after the silver strike plate processing as a cathode material in a silver plating bath containing 40 g/L of silver cyanide, 30 g/L of potassium cyanide and 30 g/L of potassium carbonate, under conditions of 30° C. for the bath temperature and 4 A/dm$^2$ for the current density, for 130 seconds, and a single silver-plated layer with 5 μm [of thickness] was formed.

[Evaluation]

(1) Adhesion Evaluation

After cutting [the obtained samples] to be grid at 1 mm of cut intervals (cross cut test), respectively, a cellophane tape (#405 manufactured by NICHIBAN Co., Ltd.) was pressed to the silver-plated layer with finger pressure, and after the cellophane tape was peeled, if peeling or swelling of the silver-plated layer did not occur, it was evaluated as ○, and if peeling or swelling occurred, it was evaluated as ×, and obtained results are shown in Table 2.

Example 6

Except for the application of gold strike plate processing instead of the silver strike plate processing as preliminary processing for forming a nickel-plated layer, a plated material was produced as similar to Example 5, and adhesion was evaluated. Obtained results are shown in Table 2.

For the gold strike plate processing above, a titanium platinum plate was used as an anode material and a reflow tin-plated material after the washing treatment above was used as a cathode material in a gold strike plating liquid containing 2 g/L of gold potassium cyanide, 100 g/L of potassium citrate, 5 g/L of chelating agent and 2 g/L of cobalt sulfate, and processing conditions were 40° C. for the bath temperature, 1 A/dm$^2$ for the current density and 10 seconds for the processing time.

Example 7

Except for the application of palladium strike plate processing instead of the silver strike plate processing as preliminary processing for forming a nickel-plated layer, a plated material was produced as similar to Example 5, and adhesion was evaluated. Obtained results are shown in Table 2.

For the palladium strike plate processing above, a titanium platinum plate was used as an anode material and a reflow tin-plated material after the peeling processing above was used as a cathode material in a palladium strike plating bath containing 3 g/L of dichloro diammine palladium and 100 g/L of potassium phosphate, and, and processing conditions were 40° C. for the bath temperature, 1 A/dm$^2$ for the current density and 10 seconds for the processing time.

Example 8

Except for the application of nickel strike plate processing instead of the silver strike plate processing as preliminary processing for forming a nickel-plated layer, a plated material was produced as similar to Example 5, and adhesion was evaluated. Obtained results are shown in Table 2.

For the nickel strike plate processing above, a nickel plate was used as an anode material and a reflow tin-plated material after the peeling processing above was used as a cathode material in a nickel strike plating liquid containing 100 g/L of nickel chloride and 50 ml/L of hydrochloric acid was used, and, and processing conditions were 20° C. for the bath temperature, 2 A/dm$^2$ for the current density and 10 seconds for the processing time.

Example 9

Except for the application of copper strike plate processing instead of the silver strike plate processing as preliminary processing for forming a nickel-plated layer, a plated material was produced as similar to Example 5, and adhesion was evaluated. Obtained results are shown in Table 2.

For the copper strike plate processing above, the copper strike plate processing was applied with a titanium platinum plate as an anode material and with a reflow tin-plated material after the peeling processing above as a cathode material in a copper strike plating bath containing 10 g/L of copper cyanide, 30 g/L of potassium cyanide and 15 g/L of potassium carbonate, under processing conditions of room temperature for the bath temperature and 2 A/dm$^2$ for the current density, for 10 seconds.

Comparative Example 1

Except for not applying the silver strike plate processing, a plated material having a nickel-plated layer and a silver-plated layer with 0.1 μm and 1 μm of thickness was produced as similar to Example 1, respectively, and various evaluations were conducted. Obtained results are shown in Table 1.

Comparative Example 2

A plated material having a silver-plated layer was produced as similar to Comparative Example 1, except for not applying the reflow tin-plate processing but applying the silver plate processing to the reflow tin-plated layer, and various evaluations were conducted. Obtained results are shown in Table 1.

Comparative Example 3

Except for not applying the silver strike plate processing as a preliminary processing of the nickel plate processing, a plated material was produced as similar to Example 5, and adhesion evaluation as similar to that in Example 5 was conducted. Obtained results are shown in Table 2.

TABLE 1

| | Thickness of nickel-plated layer (μm) | Whether or not peeling processing was applied | Thickness of silver-plated layer (μm) | Whether or not silver strike plate processing was applied | Results of adhesion evaluation | $Ag_3Sn$ peak |
|---|---|---|---|---|---|---|
| Example 1 | 0.05 | Applied | 1 | Applied | ○ | ○ |
| Example 2 | 0.1 | Applied | 1 | Applied | ○ | ○ |
| Example 3 | 0.1 | Applied | 5 | Applied | ○ | ○ |
| Example 4 | 0.1 | Applied | 10 | Applied | ○ | ○ |
| Comparative Example 1 | 0.1 | Applied | 1 | Not applied | x | ○ |
| Comparative Example 2 | — | Not applied | 1 | Applied | ○ | x |

According to the results shown in Table 1, regarding the examples of the present invention, regardless of thickness of the silver-plated layer, it is ascertained that the silver strike plating layer and the metal substrate are excellently bonded. In the meantime, when the silver strike plating is not applied, it is confirmed that the silver-plated layer is peeled according to the adhesion evaluation, and the silver-plated layer and the nickel-plated layer are not excellently bonded (Comparative Example 1).

Further, regarding the examples of the present invention, an intermetallic compound ($Ag_3Sn$) phase is not formed. In the meantime, when a reflow tin-plated layer is not peeled (Comparative Example 2), an intermetallic compound ($Ag_3Sn$) phase is formed, and embrittlement of the silver-plated layer are progressed.

TABLE 2

| | Preliminary processing of nickel plate processing (strike plate processing) | Thickness of nickel-plated layer (μm) | Thicknessof silver-plated layer (μm) | Results of cross-cut test |
|---|---|---|---|---|
| Example 5 | Applied | 1 | 5 | ○ |
| Example 6 | Applied | 1 | 5 | ○ |
| Example 7 | Applied | 1 | 5 | ○ |
| Example 8 | Applied | 1 | 5 | ○ |
| Comparative Example 3 | Not applied | 1 | 5 | x |

Excellent results of the cross-cut test were obtained from the plated material obtained in Example 5 to Example 8 where various types of strike plate processing were applied as the preliminary processing of the nickel-plate processing, and it has become ascertained that there is no problem in adhesion between the substrate and all plated layers. In the meantime, with the plated material obtained in Comparative Example 3 where no strike plate processing was applied as the preliminary processing of the nickel plate processing, peeling was confirmed between the substrate and the nickel-plated layer in the cross-cut test.

DESCRIPTION OF SYMBOLS

1 . . . plated material
2 . . . metal substrate
4 . . . reflow tin-plated layer
6 . . . silver-plated layer
8 . . . nickel-plated layer
10 . . . reactive layer
12 . . . silver strike-plated layer
14 . . . connecting terminal
16 . . . contact part
18 . . . connecting part

What is claimed is:

1. A plated material, comprising a region where a reflow tin-plated layer has been formed and another region where a silver-plated layer has been formed, on a surface of a metal substrate, respectively, wherein the silver-plated layer is formed on the surface of the metal substrate via a nickel-plated layer;

the reflow tin-plated layer and the nickel-plated layer are formed on the surface of the metal substrate via a reactive layer, respectively;

the silver-plated layer is metallurgically bonded to the nickel-plated layer;

the nickel-plated layer is metallurgically bonded to the reactive layer;

the reflow tin-plated layer is directly on the reactive layer; and the reactive layer contains $Cu_3Sn$.

2. A connecting terminal, comprising the plated material according to claim 1.

3. The connecting terminal according to claim 2, wherein the outermost surface of a joint requiring abrasion resistance is the reflow tin-plated layer; and the outermost surface of a contact part requiring electrical conductivity is the silver-plated layer.

* * * * *